(12) United States Patent
Andriessen et al.

(10) Patent No.: US 6,187,508 B1
(45) Date of Patent: Feb. 13, 2001

(54) HEAT MODE RECORDING ELEMENT BASED ON A THIN METAL LAYER

(75) Inventors: Hieronymus Andriessen, Beerse; Steven Lezy, Antwerp, both of (BE)

(73) Assignee: AGFA-Gevaert, N.V., Mortsel (BE)

( * ) Notice: Under 35 U.S.C. 154(b), the term of this patent shall be extended for 0 days.

(21) Appl. No.: 09/339,179

(22) Filed: Jun. 24, 1999

Related U.S. Application Data
(60) Provisional application No. 60/104,697, filed on Oct. 19, 1998.

(30) Foreign Application Priority Data

Aug. 14, 1998 (EP) .................................................. 98202784

(51) Int. Cl.[7] ...................................................... G03C 1/76
(52) U.S. Cl. ........................................ 430/273.1; 430/945
(58) Field of Search .............................. 430/273.1, 271.1, 430/270.1, 302, 945

(56) References Cited

U.S. PATENT DOCUMENTS

| | | | |
|---|---|---|---|
| 4,675,227 | * 6/1987 | Kivits et al. ......................... | 428/195 |
| 5,401,611 | * 3/1995 | Edwards, Sr. et al. ............... | 430/276 |
| 5,616,218 | * 4/1997 | Alex ................................. | 204/192.15 |
| 5,656,410 | * 8/1997 | Van Damme et al. ............... | 430/256 |
| 5,882,839 | * 3/1999 | Leenders et al. .................... | 430/258 |

FOREIGN PATENT DOCUMENTS 2 021 798  12/1979 (GB) .

OTHER PUBLICATIONS

Derwent Abstract, AN 94–194562, XP002086974 & JP 06 131659 A (Eumura Kogyo KK), May 13, 1994.

* cited by examiner

*Primary Examiner*—Janet Baxter
*Assistant Examiner*—Barbara Gilmore
(74) *Attorney, Agent, or Firm*—Breiner & Breiner

(57) ABSTRACT

An improved heat mode recording element based on a thin metal layer, preferably bismuth, is disclosed, characterized in that it contains hypophosphorous acid, or phosphorous acid, or a mixture of both.

3 Claims, No Drawings

HEAT MODE RECORDING ELEMENT BASED ON A THIN METAL LAYER

This Application claims the benefit of Provisional Application 60/104,697 filed Oct. 19, 1998.

FIELD OF THE INVENTION

The present invention relates to an heat mode recording element based on a thin metal layer with improved sensitivity for image formation by laser light.

BACKGROUND OF THE INVENTION

Conventional photographic materials based on silver halide are used for a large variety of applications. As is generally known silver halide materials have the advantage of high potential intrinsic sensitivity and excellent image quality. On the other hand they show the drawback of requiring several wet processing steps employing chemical ingredients which are suspect from an ecological point of view.

In the past several proposals have been made for obtaining an imaging element that can be developed using only dry development steps without the need of processing liquids as it is the case with silver halide photographic materials.

A dry imaging system known since quite a while is 3M's dry silver technology. It is a catalytic process which couples the light-capturing capability of silver halide to the image-forming capability of organic silver salts.

Another type of non-conventional materials as alternative for silver halide is based on photopolymerisation. The use of photopolymerizable compositions for the production of images by information-wise exposure thereof to actinic radiation is known since quite a while. These methods are based on the principle of introducing a differentiation in properties between the exposed and non-exposed parts of the photopolymerizable composition e.g. a difference in adhesion, conductivity, refractive index, tackiness, permeability, diffusibility of incorporated substances e.g. dyes etc. The thus produced differences may be subsequently employed in a dry treatment step to produce a visible image and/or master for printing e.g. a lithographic or electrostatic printing master.

As a further alternative for silver halide chemistry dry imaging elements are known that can be image-wise exposed using an image-wise distribution of heat. When this heat pattern is applied directly by means of a thermal head such elements are called thermographic materials. When the heat pattern is applied by the transformation of intense laser light into heat these elements are called heat mode materials or thermal imaging media. They offer the additional advantage compared to most photo mode systems that they do not need to be handled in a dark room nor that any other protection from ambient light is needed.

In a particular type of heat mode elements, e.g. as disclosed in EP 0 674 217, density is generated by image-wise chemical reduction of organic metal salts, preferably silver salts such as silver behenate, without the presence of catalytic amounts of exposed silver halide such it is the case in the dry silver system.

Another important category of heat mode recording materials is based on change of adhesion, e.g. as disclosed in U.S. Pat. No. 4,123,309, U.S. Pat. No. 4,123,578, U.S. Pat. No. 4,157,412, U.S. Pat. No. 4,547,456 and PCT publ. Nos. WO 88/04237, WO 93/03928, and WO 95/00342.

In still another particular type of thermal recording or heat mode recording materials information is recorded by creating differences in reflection and/or in transmission on the recording layer. The recording layer has high optical density and absorbs radiation beams which impinge thereon. The conversion of radiation into heat brings about a local temperature rise, causing a thermal change such as evaporation or ablation to take place in the recording layer. As a result, the irradiated parts of the recording layer are totally or partially removed, and a difference in optical density is formed between the irradiated parts and the unirradiated parts (cf. U.S. Pat. Nos. 4,216,501, 4,233,626, 4,188,214 and 4,291,119 and British Pat. No. 2,026,346)

The recording layer of such heat mode recording materials is usually made of metals, dyes, or polymers. Recording materials like this are described in 'Electron, Ion and Laser Beam Technology", by M. L. Levene et al.; The Proceedings of the Eleventh Symposium (1969); "Electronics" (Mar. 18, 1968), P. 50; "The Bell System Technical Journal", by D. Maydan, Vol. 50 (1971), P. 1761; and "Science", by C. O. Carlson, Vol. 154 (1966), P. 1550.

Recording on such thermal recording materials is usually accomplished by converting the information to be recorded into electrical time series signals and scanning the recording material with a laser beam which is modulated in accordance with the signals. This method is advantageous in that recording images can be obtained on real time (i.e. instantaneously). Recording materials of this type are called "direct read after write" (DRAW) materials. DRAW recording materials can be used as a medium for recording an imagewise modulated laser beam to produce a human readable or machine readable record. Human readable records are e.g. micro-images that can be read on enlargement and projection. An example of a machine readable DRAW recording material is the optical disc. To date for the production of optical discs tellurium and its alloys have been used most widely to form highly reflective thin metal films wherein heating with laser beam locally reduces reflectivity by pit formation (ref. e.g. the periodical 'Physik in unserer Zeit', 15. Jahrg. 1984/Nr. 5, 129–130 the article "Optische Datenspeicher" by Jochen Fricke). Tellurium is toxic and has poor archival properties because of its sensitivity to oxygen and humidity. Other metals suited for use in DRAW heat-mode recording are given in U.S. Pat. No. 4,499,178 and U.S. Pat. No. 4,388,400. To avoid the toxicity problem other relatively low melting metals such as bismuth have been introduced in the production of a heat-mode recording layer. By exposing such a recording element very shortly by pulses of a high-power laser the writing spot ablates or melts a small amount of the bismuth layer. On melting the layer contracts on the heated spot by surface tension thus forming small cavitations or holes. As a result light can pass through these cavitations and the density is lowered to a certain Dmin value depending on the laser energy irradiated.

According to EP 0 384 041 a process is provided for the production of a heat mode recording material having "direct read after write" (DRAW) possibilities wherein a web support is provided with a heat mode recording thin metal layer, preferably a bismuth layer, characterized in that in the same vacuum environment a protective organic resin layer in web form is laminated to said supported recording layer by means of an adhesive layer.

A commercially available material manufactured according to the principles of cited EP 0 384 041 is MASTER-TOOL MT8, registered trade name, marketed by Agfa-Gevaert N. V.

A drawback of the method of preparation of a thin bismuth recording layer by vacuum deposition is the fact that this is a complicated, cumbersome and expensive process. Therefore, in pending European patent application appl. No. 98201117 an alternative process for applying a thin metal layer is described comprising the following steps:

(1) preparing an aqueous medium containing ions of a metal,
(2) reducing said metal ions by a reducing agent thus forming metal particles,
(3) coating said aqueous medium containing said metal particles on said transparent support.

In a preferred embodiment the metal layer is again a bismuth layer. However such bismuth layers coated from an aqueous medium suffer in their turn from another drawback. Compared to bismuth layers prepared by vacuum deposition their sensitivity to laser light is lower. This is due to the presence of a higher degree of oxidized bismuth, and to the presence of ballast compounds in the layer such as a binder and additives improving stability, which to a certain degree hamper the formation of microspheres by the action of laser radiation.

The present invention extends the teachings on heat mode recording elements based on thin metal layers applied by coating from an aqueous medium.

OBJECTS OF THE INVENTION

It is an object of the present invention to provide a heat mode recording element based on a coated thin metal layer with improved sensitivity and Dmin.

It is a further object of the present invention to provide a heat mode element less susceptible to bubble formation during laser recording.

It is still another object of the present invention to provide such an improved heat mode recording element wherein the thin metal layer is coatable from an aqueous medium.

SUMMARY OF THE INVENTION

The above mentioned objects are realised by providing a heat mode recording element comprising, in order, (1) a transparent support optionally carrying a subbing layer,
(2) a thin metal layer,
(3) a protective layer or layer pack, characterized in that said heat mode recording element contains hypophosphorous acid, or phosphorous acid, or a mixture of both.

In a preferred embodiment the thin metal layer is a bismuth layer. The hypophosphorous acid, or phosphorous acid, or mixture of both may be present in the metal layer, in the first protective layer of the protective layer pack, or in both.

DETAILED DESCRIPTION OF THE INVENTION

The different elements constituting the heat mode recording material obtained by the process according to the present invention will now be explained in more detail.

Useful transparent organic resin supports include e.g. cellulose nitrate film, cellulose acetate film, polyvinylacetal film, polystyrene film, polyethylene terephthalate film, polycarbonate film, polyvinylchloride film or poly-α-olefin films such as polyethylene or polypropylene film. The thickness of such organic resin film is preferably comprised between 0.05 and 0.35 mm. In a most preferred embodiment of the present invention the support is a polyethylene terephthalate layer provided with a subbing layer. This subbing layer can be applied before or after stretching of the polyester film support. The polyester film support is preferably biaxially stretched at an elevated temperature of e.g. 70–120° C., reducing its thickness by about ½ to ⅙ or more and increasing its area 2 to 9 times. The stretching may be accomplished in two stages, transversal and longitudinal in either order or simultaneously. The subbing layer, when present, is preferably applied by aqueous coating between the longitudinal and transversal stretch, in a thickness of 0.1 to 5 mm. In case of a bismuth recording layer the subbing layer preferably contains, as described in European Patent Application EP 0 464 906, a homopolymer or copolymer of a monomer comprising covalently bound chlorine. Examples of said homopolymers or copolymers suitable for use in the subbing layer are e.g. polyvinyl chloride; polyvinylidene chloride; a copolymer of vinylidene chloride, an acrylic ester and itaconic acid; a copolymer of vinyl chloride and vinylidene chloride; a copolymer of vinyl chloride and vinyl acetate; a copolymer of butylacrylate, vinyl acetate and vinyl chloride or vinylidene chloride; a copolymer of vinyl chloride, vinylidene chloride and itaconic acid; a copolymer of vinyl chloride, vinyl acetate and vinyl alcohol etc. Polymers that are water dispersable are preferred since they allow aqueous coating of the subbing layer which is ecologically advantageous.

The process for preparing the thin metal layer on the transparent support will now be explained on the hand of the preferred embodiment wherein the metal is bismuth.

In a first step an aqueous solution of bismuth ions is prepared. As most suitable bismuth salt bismuth nitrate is chosen. Almost all bismuth salts are poorly soluble in water. In order to maintain a sufficient amount of bismuth ions in solution, it is necessary to add a complexing agent. A preferred complexant is simply the well-known ethylenediaminetetraacetic acid (EDTA) or a homologous compound or a salt thereof. Another preferred one is citrate, e.g. triammonium citrate. Other suitable complexants include diethylenetriamine-pentaacetic acid (DTPA), trans-1,2-diaminocyclohexane-N,N,N',N'-tetraacetic acid (CDTA), ethyleneglycol-O,O'-bis(2-aminoethyl)-N,N,N',N'-tetraacetic acid (EGTA), N-(2-hydroxyethyl) ethylenediamine-N,N,N'-triacetic acid (HEDTA), etc.

In a following step the bismuth ions in the solution are reduced to highly dispersed bismuth particles by means of the addition of a reducing agent. A preferred reducing agent is sodium hyposulphite. Another suitable reducing agent is $KBH_4$. Others include glucose, formaldehyde, tin(II) chloride. The reducing agent can be added to the original bismuth salt solution as a solid powder. On the other hand the reducing agent can be dissolved separately in a second aqueous medium and added to the bismuth-tin salt solution according to a single jet or a double jet procedure. Preferably, according to the double jet principle, the aqueous medium containing the different metal ions and the second solution containing the reducing agent are added together to a third aqueous medium.

In order to keep the bismuth particles formed by reduction in colloidal dispersion a protective binder is preferably added to one or more of the three aqueous solution involved. Preferably, this protective binder is added to the third aqueous medium wherein both others are jetted. A particularly preferred protective binder is carboxymethylcellulose (CMC), preferably of the high viscosity type. Other possible binders include gelatin, arabic gum, poly(acrylic acid), cellulose derivatives and other polysaccharides.

When the reduction is substantially completed the aqueous medium can directly be coated on a support but more preferably the superfluous salts are first removed from the aqueous medium by a washing process, preferably involving optionally ultrafugation, ultrafiltration and/or diafiltration. In any of the solution involved in the preparation a so-called dispersing aid can be present. In a preferred embodiment this compound is added to the diafiltration liquid at the last stage of the preparation. Suitable dispersing aids in the case of bismuth are pyrophosphates, more particularly a hexametaphosphate such as sodium hexametaphosphate. Probably, the hexametaphosphate adsorbs to the surface of the bismuth particles so that they become negatively charged. By electrostatic repulsion they are kept in dispersion. So in a preferred embodiment the bismuth particles are ultrafiltrated e.g. through a Fresenius F60 cartridge and subsequently diafiltrated against a solution of sodium hexametaphosphate in water/ethanol (98.5/1.5).

In the final aqueous medium preferable an anti-oxidant, added at any stage of the preparation, such as ascorbic acid or a derivative thereof is present in order to avoid oxidation to bismuth oxide which would lead to an unacceptable density loss during drying after coating or during conservation of the unprotected bismuth layer. Finally, after the addition of one or more coating agents the obtained aqueous medium is coated on the transparent substrate by means of a conventional coating technique, such as slide hopper, curtain coating and air-knife coating.

Suitable coating agents include non-ionic agents such as saponins, alkylene oxides e.g. polyethylene glycol, polyethylene glycol/polypropylen glycol condensation products, polyethylene glycol alkyl esters or polyethylene glycol alkylaryl esters, polyethylene glycol esters, polyethylene glycol sorbitan esters, polyalkylene glycol alkylamines or alkylamides, silicone-polyethylene oxide adducts, glycidol derivaties, fatty acid esters of polyhydric alcohols and alkyl esters of saccharides; anionic agenst comprising an acid group such as a carboxy, sulpho, phospho, sulphuric or phosphorous ester group; ampholytic agents such as aminoacids, aminoalkyl sulphonic acids, aminoalkyl sulphates or phosphates, alkyl betaines, and amine-N-oxides; and cationic agents such as aklylamine salts, aliphatic, aromatic, or heterocyclic quaternary ammonium salts, aliphatic or heterocyclic ring-containing phosphonium or sulphonium salts. Other suitable surfactants include perfluorinated compounds.

The particle size of the reduced metalic bismuth is preferably comprised between 5 and 300 nm, most preferably 10 and 200 nm. The thickness of this Bi layer is preferably comprised between 0.1 and 1.5 $\mu$m. When this thickness is too low the recorded images do not have sufficient density. When on the other hand the thickness is too high the sensitivity tends to decrease and the minimal density, i.e. the density after laser recording on the exposed areas tends to be higher.

The formation of the thin metal recording layer has been described on the hand of the preferred embodiment wherein the metal is bismuth. However, the scope of the present invention is not limited to bismuth, but extends to other metals that can form thin metal recording layers by a similar procedure. Possible other metals for the recording layer in this invention include Mg, Mn, Cu, Ag, Au, Zn, Cd, Al, Ga, In, Ge, Sn, As, Sb, Se, Te, Sr, La, Pb, Nd, Ba, Be, Ca, and Ce.

It will be readily understood that for each particular metal the choice of the metal ions, the complexant if any, the binder and dispersing aid, the reducing agent, etc., must be optimized and that the preferred embodiments will in most cases deviate from the preferred embodiments when the metal is bismuth.

Preferably the hypophosphorous acid or the phosphorous acid or the mixture of both is incorporated, totally or partially, in the metal layer itself. The acid is preferably added after ultrafiltration to the final aqueous coating solution for the metal layer right before coating. Without willing to be bound by theory a possible explanation for the action of the (hypo)phosphorous acid in the case of a bismuth layer is the following. In the layer the acid reacts with unwanted residual trivalent bismuth thereby inducing the formation of hydrogen gas. This hydrogen gas, adsorbed to the metallic bismuth, will probably react in an exothermic way during the laser recording with one or more compounds present in the layer such as $O_2$, $CO_2$, carboxymethylcellulose and hexametaphosphate. Thanks to this extra thermal push a lower amount of laser energy is needed for the formation of micropheres which means that the material has become more sensitive. This hypothesis is sustained by ESCA measurements which show that the amount of trivalent bismuth is considerably less than in layers containing no (hypo) phosphorous acid.

The layer may extra be stabilized by the addition of sulphite or hydroquinone or another anti-oxidant.

Two additional advantages obtained by the addition of (hypo)phosphorous acid are worth mentioning. Firstly, a lower Dmin is obtained which can be attributed to the lower amount of bismuth oxide, and secondly, no bubble formation occurs any longer during laser recording. The bubble formation is probably due to the decarboxylation of the present bismutite at 290° C. Due to the lower amount of oxidized bismuth the amount of bismutite is also lowered.

Although the (hypo)phosphorous acid is preferably present in the metal layer itself it can in principle be incorporated in the subbing layer covering the support or in one of the layers of the protective layer pack covering the thin metal layer. Such a protective layer or layer pack is highly wanted because the metal layer is very sensitive to mechanical damage.

Three types of protective elements are preferred.

In a first preferred particular embodiment this protective element comprises a transparent organic resin, acting as outermost cover sheet, and an adhesive layer. In this case the (hypo)phosphorous acid may be incorporated in the adhesive layer. The adhesive layer can be of the pressure-adhesive type or of the thermoadhesive type. Examples of pressure-adhesive resins are described in U.S. Pat. No. 4,033,770 for use in the production of adhesive transfers (decalcomanias) by the silver complex diffusion transfer process, in the Canadian Patent 728,607 and in the U.S. Pat. No. 3,131,106. When the adhesive layer is of the heat-activatable, also called thermoadhesive type, the adhesive layer is preferably applied on top of the metal layer by lamination together with the resin foil to which it is preliminary applied by coating. The exterior resin foil can be chosen from the group of polymeric resins usable for the support of the heat mode element. In a preferred embodiment the cover sheet is also polyethylene terephthalate but preferably substantially thinner (about 10 $\mu$m) than the polyethylene terephthalate of the support.

A survey of pressure and/or heat-sensitive adhesives is given by J. Shields in "Adhesives Handbook", 3rd. ed. (1984), Butterworths-London, Boston, and by Ernest W. Flick in "Handbook of Adhesive Raw Materials" (1982), Noyens Publications, Park Ridge, N.J.—USA.

In a second preferred type of protective layer pack two layers are coated on top of the metal layer, a soft polymeric layer and an outermost hard polymeric layer. In this case the (hypo)phosphorous acid may be incorporated in the soft polymeric layer while still being effective. Combinations of useful compositions for the soft and the hard polymeric layers are described in Europen patent application appl. No. 98201117 cited above.

A third type of protective element consists of just one layer which due to the presence of a reactive monomer is radiation-curable, preferably UV-curable. Protective elements of this type are disclosed in pending European patent application appl. No. 97203857. In this case the (hypo) phosphorous acid may be incorporated in that curable protective layer.

Since the (hypo)phosphorous acid can cause some instability in the coating solution containing the reduced metal dispersion it can be divided between this metal coating solution and the coating solution for a protective layer or for the subbing layer. In this way the stability of the coating layer can be assured. In this particular embodiment the acid is present in several different layers of the final heat mode recording element.

For the formation of a heat mode image using the element of the present invention any laser can be used which provides enough energy needed for the production of sufficient heat for this particular process of image formation. In a preferred embodiment a powerful infra-red laser is used, most preferably a Nd-YLF laser or diode laser.

The present invention will now be illustrated by the following examples without however being limited thereto.

EXAMPLES

Example 1

This example shows the improvements in sensitivity that can be obtained by adding hypophosphorous acid to the heat mode laser recordable Bi-layer.

The following solutions were prepared:

| Solution 1 | |
|---|---|
| Water | 400 ml |
| Bi(NO$_3$)$_3$.5H$_2$O | 449 g |
| Triammonium citrate (50% in water) | 1200 ml |
| NH$_3$ (26% in water) (pH = 12) | 300 ml |
| Water to | 2330 ml |
| Solution 2 | |
| Na$_2$S$_2$O$_4$ (16.7% in water) | 1238 ml |
| Solution 3 | |
| Water | 1136 ml |
| Carboxymethylcellulose (3% in water) | 104 ml |

The samples, according to following table 1, were prepared as follows:

To solution 3, held at 40° C. and stirred at 450 rpm, solution 1 at a flow rate of 200 ml/min was simultaneously added with solution 2 at 117 ml/min. After the reduction, the bismuth dispersion was ultrafiltrated through a Fresenius F60 cartridge and diafiltrated with a 0.2% solution of sodium hexametaphosphate in water/ethanol (98.5/1.5).

The dispersion was stirred and 10 ml of a 12.5% solution of Saponine Quillaya (Schmittmann) in water/ethanol (80/20) was added.

The dispersion was analysed for its particle size distribution (weight average d$_{wa}$) with the Disc Centrifuge Photosedimentometer BROOKHAVEN BI-DCP. A d$_{wa}$ of 65 nm (s$_{wa}$=6) was obtained.

The dispersion was divided in small portions and to each of these portions, except for the control sample, a certain amount of a 50% solution of H$_3$PO$_2$ (Merck) was added according to table 1.

Subsequently these dispersions were coated on a substrated PET foil so that a density of 3.5 (Macbeth optical densitometer) was obtained. Thereupon a protective laminate comprising a 8 μm thick pressure-adhesive layer, type DURO-TAK 380-2954, National Starch and Chemical Co., and a 12 μm thick PET foil was laminated by using CODOR LAMIPACKER LPP650.

The exposure was performed by a NdYLF laser emitting at 1064 nm. The image plane power was set between 200 and 450 mW maximum with intervals of 50 mW. A spot size of 16 μm was used together with a pitch of 8 μm at a scan speed of 2 m/s. The sensitivity is defined as the energy necessary to obtain a linewith of 8 μm in the image (microscopic evaluation) and is expressed in J/m$^2$ (E$_{ss}$= E$_{single\ scan}$). The smaller this number, the more sensitive the film is.

Table 1 lists the obtained results.

TABLE 1

| Sample | ml 50% H$_3$PO$_2$ per liter dispersion | E$_{ss}$ (J/m$^2$) |
|---|---|---|
| 1 (control) | 0 | 5000 |
| 2 (invention) | 4 | 4750 |
| 3 (invention) | 8 | 3800 |
| 4 (invention) | 12 | 3600 |
| 5 (invention) | 22 | 3300 |

As can be concluded from the results of table 1, adding hypophosphorous acid improves the sensitivity. No bubble formation cured during laser recording.

Example 2

This example shows the improvements in sensitivity and D$_{min}$ that can be obtained by adding hypophosphorous acid to a pressure-adhesive layer of the laminate in stead of adding the hypophosphorous acid to the heat mode laser recordable Bi-layer.

The bismuth dispersion was prepared as was described in example 1. This dispersion was coated on a substrated PET foil so that a density of 3.5 (Macbeth optical densitometer) was obtained.

Pressure adhesive layers were prepared according to table II and coated with a barcoater of 40 μm on a Melinex S (ICI) support of 23 μm. This coatings were laminated against the Bi-layer by using the CODOR LAMIPACKER LPP650 at room temperature.

Laser exposures of these samples were performed as described in example 1 and the results are listed in table II.

TABLE II

| Sample | Solvent* | Composition PSA** | $H_3PO_2$*** | $D_{max}$ | $D_{min}$ | $E_{ss}$ (J/m$^2$) |
|---|---|---|---|---|---|---|
| 6 (control) | EM | Solucryl 303 (UCB) | No | 3.80 | 0.31 | 3700 |
| 7 (invention) | EM | Solucryl 303 (UCB) | Yes | 3.80 | 0.27 | 3000 |
| 8 (control) | EM | Solucryl 371 (UCB) | No | 3.40 | 0.38 | 3600 |
| 9 (invention) | EM | Solucryl 371 (UCB) | Yes | 3.60 | 0.28 | 3150 |
| 10 (control) | DW | A231 (Adhesives Int. Ltd.) | No | 3.70 | 0.31 | 3850 |
| 11 (invention) | DW | A231 (Adhesives Int. Ltd.) | Yes | 2.90 | 0.30 | 2900 |
| 12 (control) | EM | PSA4333 (Akzo Nobel) | No | 3.50 | 0.27 | 3700 |
| 13 (invention) | EM | PSA4333 (Akzo Nobel) | Yes | 2.80 | 0.26 | 3000 |
| 14 (control) | DW | PS-34-320 (Permutex) | No | 4.00 | 0.44 | 3850 |
| 15 (invention) | DW | PS-34-320 (Permutex) | Yes | 3.60 | 0.37 | 3150 |
| 16 (control) | DW | PS-34-211 (Permutex) | No | 3.70 | 0.33 | 3600 |
| 17 (invention) | DW | PS-34-211 (Permutex) | Yes | 3.10 | 0.30 | 3150 |
| 18 (control) | DW | PS-34-260 (Permutex) | No | 3.70 | 0.36 | 3600 |
| 19 (invention) | DW | PS-34-320 (Permutex) | Yes | 3.25 | 0.33 | 3250 |

*EM = 1/1 ethylacetate/methylethylketon; DW = Distilled Water
**Pressure Sensitive Adhesive: 4.5 g/m$^2$
***0.16 g $H_3PO_2$/m$^2$ As can be seen from table II, the addition of hypophosphorous acid to the pressure sensitive adhesive layer improves the laser sensitivity of the material whereas $D_{min}$ also decreases. No bubble formation occured during laser recording.

Example 3

This example shows the improvements in sensitivity and $D_{min}$ that can be obtained in case the Bi-layer is coated with two protective coatings: the one in contact with the Bi-layer having a low $T_g$ en containing the hypophosphorous acid and the top layer having a higher $T_g$ in order to give the Bi-layer physical protection.

The bismuth dispersion was prepared as was described in example 1. To this dispersion hypophosphorous acid was added to pH 4.9. This dispersion was coated on a substrated PET foil so that a density of 3.5 (Macbeth optical densitometer) was obtained.

On this Bi-layer a layer (PL-1) with low $T_g$ was applied according to table III to which the hypophosphorous acid could be added. On this layer a second protective layer (PL-2) with a higher $T_g$ was applied (table III). Also a simultaneous coating of PL-1 and PL-2 could be used.

Laser exposures of these samples were performed as described in example 1 and the results are listed in table IV.

TABLE III

| Sample | PL-1 | Dry thickness ($\mu$m) | PL-2 | Dry thickness ($\mu$m) |
|---|---|---|---|---|
| 20 | Neocryl BT9 (UCB) | 3 | co(ethylacrylate-metacrylic acid) | 3 |
| 21 | Neocryl BT9 (UCB) | 3 | polyvinylalcohol/trimethoxysilane | 3 |
| 22 | Ucecryl 812B (UCB) | 3 | co(ethylacrylate-metacrylic acid) | 3 |
| 23 | Ucecryl 812B (UCB) | 3 | polyvinylalcohol/trimethoxysilane | 3 |
| 24 | Ucecryl BM (UCB) | 3 | co(ethylacrylate-metacrylic acid) | 3 |
| 25 | Ucecryl BM (UCB) | 3 | polyvinylalcohol/trimethoxysilane | 3 |
| 26 | Ucecryl BM (UCB) | 3 | Ucecoat 5160 (UCB) | 3 |

TABLE IV

| Sample | $H_3PO_2$ in PL-1 (mg/m$^2$) | pH of PL-1 | $D_{max}$ | $D_{min}$ | $E_{ss}$ |
|---|---|---|---|---|---|
| 20-1 (control) | 0 | 5.20 | 3.80 | 0.43 | 3900 |
| 20-2 (invention) | 15 | 2.30 | 3.60 | 0.36 | 3800 |
| 20-3 (invention) | 30 | 2.03 | 3.70 | 0.36 | 2800 |
| 20-4 (invention) | 45 | 2.00 | 3.70 | 0.41 | 3000 |
| 20-5 (invention) | 75 | 1.85 | 3.40 | 0.50 | 2700 |
| 21-1 (control) | 0 | 5.20 | 3.50 | 0.39 | 3500 |
| 21-2 (invention) | 45 | 1.90 | 3.40 | 0.33 | 3000 |
| 22-1 (control) | 0 | 7.90 | 3.80 | 0.41 | 3600 |
| 22-2 (invention) | 45 | 2.10 | 3.70 | 0.34 | 2700 |
| 23-1 (control) | 0 | 7.90 | 3.80 | 0.49 | 4100 |
| 23-2 (invention) | 45 | 2.10 | 3.00 | 0.41 | 3300 |
| 24-1 (control) | 0 | 4.00 | 3.70 | 0.34 | 3500 |
| 24-2 (invention) | 45 | 2.00 | 3.70 | 0.29 | 2800 |
| 25-1 (control) | 0 | 4.00 | 3.80 | 0.42 | 3300 |
| 25-2 (invention) | 45 | 2.00 | 3.50 | 0.38 | 3000 |
| 25-1 (control) | 0 | 4.00 | 3.80 | 0.39 | 3800 |
| 25-2 (invention) | 45 | 2.00 | 3.60 | 0.34 | 3500 |

Example 4

This example demonstrates that the hypophosphorous acid in the Bi-layer is responsible for a decrease in minimum density after laserrecording and that the hypophosphorous acid in the first protective layer causes the improvement in sensitivity.

The bismuth dispersion was prepared as was described in example 1. This dispersion was divided in three and the samples were treated according to table V. These dispersions were coated on a substrated PET foil so that a density of 3.5 (Macbeth optical densitometer) was obtained.

On this Bi-layer Ucecryl BM (PL-1) was coated according to tabel V (dry thickness 3 $\mu$m). On this layer an Ucecoat 5160 (a waterborne, self-crosslinking acrylic/polyurethane hybrid dispersion, available from UCB) layer was applied with a dry thickness of 3 $\mu$m.

Laser exposures of these samples were performed as described in example 1 and the results are listed in table V.

TABLE V

| Sample | Bismuth dispersion Additive | pH | PL-1 Additive | pH | $D_{max}$ | $D_{min}$ | $E_{ss}$ |
|---|---|---|---|---|---|---|---|
| 26 (control) | — | 6.80 | — | 4.00 | 3.10 | 0.35 | 3600 |
| 27 (control) | HCl | 4.90 | — | 4.00 | 3.10 | 0.37 | 3700 |
| 28 (invent.) | $H_3PO_2$ | 4.90 | — | 4.00 | 3.80 | 0.32 | 3800 |
| 29 (invent.) | — | 6.80 | $H_3PO_2$ | 2.00 | 3.80 | 0.30 | 2950 |
| 30 (invent.) | HCl | 4.90 | $H_3PO_2$ | 2.00 | 3.60 | 0.32 | 2950 |
| 31 (invent.) | $H_3PO_2$ | 4.90 | $H_3PO_2$ | 2.00 | 3.40 | 0.28 | 2800 |

This example demonstrates that adding hypophosphorous acid to the Bi-layer and to the adjacent upper layer causes a synergistic effect. No bubble formation occured during laser recording.

Example 5

This example demonstrates that hypophosphorous acid can be substituted by phosphorous acid, resulting in the similar effects: higher laser sensitivity and lower $D_{min}$.

The bismuth dispersion was prepared as was described in example 1. This dispersion was divided in two and the samples were treated according to table VI. These dispersions were coated on a substrated PET foil so that a density of 3.5 (Macbeth optical densitometer) was obtained.

On this Bi-layer Ucecryl BM (PL-1) was coated according to tabel VI (dry thickness 3 μm). On this layer an Ucecoat 5160 (UCB) layer was applied with a dry thickness of 3 μm.

Laser-exposures of these samples were performed as described in example 1 and the results are listed in table VI.

TABLE VI

| Sample | Bismuth dispersion Additive | pH | PL-1 Additive | pH | $D_{max}$ | $D_{min}$ | $E_{ss}$ |
|---|---|---|---|---|---|---|---|
| 25-1 (cont.) | $H_3PO_2$ | 4.9 | — | 4.00 | 3.80 | 0.39 | 3800 |
| 32 (comp.) | $H_3PO_2$ | 4.7 | $H_3PO_2$ | 1.80 | 3.40 | 0.30 | 2600 |
| 33 (inv.) | $H_3PO_2$ | 4.7 | $H_3PO_3$ | 1.80 | 3.40 | 0.32 | 3000 |
| 34 (inv.) | $H_3PO_3$ | 4.7 | $H_3PO_2$ | 1.80 | 2.80 | 0.24 | 3200 |
| 35 (inv.) | $H_3PO_3$ | 4.7 | $H_3PO_3$ | 1.80 | 2.70 | 0.30 | 2900 |

Example 6

This example demonstrates that the shelf-life of the materials containing hypophosphorous acid can be improved by adding suitable anti-oxidantia to the bismuth-dispersion and/or to the first protective layer.

The bismuth dispersion was prepared as was described in example 1. To some samples $H_3PO_2$ was added until a pH value of 4.7 was reached. To the dispersion several anti-oxidantia were added according to table VII. These dispersions were coated on a substrated PET foil so that a density of 3.5 (Macbeth optical densitometer) was obtained.

On this Bi-layer Ucecryl BM (PL-1) was coated wih addition of several anti-oxidantia, according to tabel VII (dry thickness 3 μm). On this layer an Ucecoat 5160 (UCB) layer was applied with a dry thickness of 3 μm.

The samples were laser exposed immediately after preparation and after a stay of three days in a climaticroom of 35° C. and 80% relative humidity. Laser exposures of these samples were performed as described in example 1 and the results are listed in table VII.

TABLE VII

| Sample | Bismuth dispersion $H_3PO_2$ | Anti-oxidans (mg/m$^2$) | PL-1 $H_3PO_2$ (mg/m$^2$) | Anti-oxidans (mg/m$^2$) | $D_{max}$ fresh | $D_{max}$ 3d 35° C./ 80% RH | $D_{min}$ fresh | $D_{min}$ 3d 35° C./ 80% RH | $E_{ss}$ fresh | $E_{ss}$ 3d 35° C. 80% RH |
|---|---|---|---|---|---|---|---|---|---|---|
| 36 (control) | no | 0 | 0 | 0 | 3.30 | 3.30 | 0.41 | 0.41 | 3500 | 3500 |
| 37 (comp.) | yes | 0 | 0 | 0 | 3.20 | 3.00 | 0.35 | 0.44 | 3500 | 3600 |
| 38 (invent.) | yes | $Na_2SO_3$ (20) | 0 | 0 | 3.30 | 3.20 | 0.33 | 0.35 | 3600 | 3700 |
| 39 (comp.) | yes | 0 | 45 | 0 | 3.60 | 2.50 | 0.30 | 0.38 | 2800 | 3800 |
| 40 (invent.) | yes | $Na_2SO_3$ (20) | 45 | 0 | 4.20 | 4.00 | 0.44 | 0.47 | 3600 | 3500 |
| 41 (invent.) | yes | 0 | 45 | $Na_2SO_3$ (45) | 3.50 | 3.40 | 0.42 | 0.46 | 3000 | 3200 |
| 42 (invent.) | yes | $Na_2SO_3$ (20) | 45 | $Na_2SO_3$ (45) | 1.30 | 1.30 | — | — | — | — |
| 43 (invent.) | yes | hydroquinone (45) | 45 | $Na_2SO_3$ (45) | 3.40 | 3.20 | 0.47 | 0.49 | 2900 | 3100 |

It is clear from the results of table VII that the shelf life as simulated by the 3 d 35° C./80% RH test was improved for the samples containing an anti-oxidant.

What is claimed is:

1. Heat mode recording element comprising, in order,
   (1) a transparent support optionally carrying a subbing layer,
   (2) a thin metal layer,
   (3) a protective layer or layer pack,
   wherein said heat mode recording element contains hypophosphorous acid, or phosphorous acid, or a mixture of both, and wherein said hypophosphorous acid or phosphorous acid or mixture of both is present in said thin metal layer.

2. Heat mode recording element comprising, in order,
   (1) a transparent support optionally carrying a subbing layer,
   (2) a thin metal layer,
   (3) a protective layer or layer pack, wherein said heat mode recording element contains hypophosphorous acid, or phosphorous acid, or a mixture of both, wherein said protective layer pack comprises a soft polymeric layer and an outermost hard polymeric layer, and wherein said hypophosphorous acid or phosphorous acid or mixture of both is incorporated in said soft polymeric layer, and/or in said thin metal layer.

3. Heat mode recording element comprising, in order, (1) a transparent support optionally carrying a subbing layer, (2) a thin metal layer, (3) a protective layer or layer pack, wherein said heat mode recording element contains hypophosphorous acid, or phosphorous acid, or a mixture of both, wherein said protective layer pack comprises an adhesive layer and an outermost polymeric resin foil, and wherein said hypophosphorous acid or phosphorous acid or mixture of both is incorporated in said adhesive layer, and/or in said thin metal layer.

* * * * *